(12) United States Patent
Wu

(10) Patent No.: US 9,491,568 B2
(45) Date of Patent: Nov. 8, 2016

(54) SYSTEM AND METHOD FOR MOBILE TERMINAL INTERACTIONS

(71) Applicant: TENCENT TECHNOLOGY (SHENZHEN) COMPANY LIMITED, Shenzhen (CN)

(72) Inventor: Shixiang Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/751,016

(22) Filed: Jun. 25, 2015

(65) Prior Publication Data

US 2015/0296323 A1  Oct. 15, 2015

Related U.S. Application Data

(63) Continuation of application No. PCT/CN2013/088159, filed on Nov. 29, 2013.

(30) Foreign Application Priority Data

Dec. 26, 2012  (CN) .......................... 2012 1 0574809

(51) Int. Cl.
| | |
|---|---|
| H04W 4/00 | (2009.01) |
| H04M 1/725 | (2006.01) |
| G08B 21/00 | (2006.01) |
| G08B 21/06 | (2006.01) |
| G08B 21/18 | (2006.01) |
| G08B 21/24 | (2006.01) |

(52) U.S. Cl.
CPC ............ *H04W 4/005* (2013.01); *G08B 21/182* (2013.01); *H04M 1/72547* (2013.01); *G08B 21/24* (2013.01)

(58) Field of Classification Search
CPC ..... H04W 4/005; H04W 4/08; H04W 84/10; H04W 8/186; H04M 1/72547; G08B 21/182; G08B 21/24
USPC ........ 455/414.1, 151.2; 704/E19.001; 607/2, 607/54, 554; 600/301, 300
See application file for complete search history.

(56) References Cited

U.S. PATENT DOCUMENTS

| | | | |
|---|---|---|---|
| 2009/0096782 A1* | 4/2009 | Lee .................. | H04M 1/72555 345/419 |
| 2011/0125063 A1* | 5/2011 | Shalon ................ | A61B 5/0006 600/590 |

(Continued)

FOREIGN PATENT DOCUMENTS

| | | |
|---|---|---|
| CN | 1291112 A | 4/2001 |
| CN | 1433237 A | 7/2003 |

OTHER PUBLICATIONS

The World Intellectual Property Organization (WIPO) International Search Report for PCT/CN2013/088159 Mar. 13, 2014.

*Primary Examiner* — Inder Mehra
(74) *Attorney, Agent, or Firm* — Anova Law Group, PLLC

(57) ABSTRACT

The present disclosure provides an interaction method and interaction system for mobile terminals. The method includes acquiring a sensor signal from a mobile terminal, and transmitting a life emotion signal corresponding to the current sensor signal if an amplitude of the current sensor signal exceeds a set threshold. Embodiments of the present disclosure improve interactivity of the mobile terminals with users and provide timely feedback to users.

20 Claims, 2 Drawing Sheets

(56) References Cited

U.S. PATENT DOCUMENTS

2011/0172992 A1* 7/2011 Shin .................. G10L 17/26
                                                  704/201
2011/0283189 A1* 11/2011 McCarty ............ H04N 5/44543
                                                  715/707
2014/0025376 A1* 1/2014 Wasserblat ............ G10L 25/51
                                                  704/238
2015/0312669 A1* 10/2015 Song .................. A61B 5/02438
                                                  381/74
2016/0043818 A1* 2/2016 Peiffer .................. H04H 60/33
                                                  455/2.01

* cited by examiner

SYSTEM AND METHOD FOR MOBILE TERMINAL INTERACTIONS

RELATED APPLICATION

This application claims priority to PCT Application No. PCT/CN2013/088159, filed on Nov. 29, 2013, which claims priority to Chinese Patent Application No. 201210574809.6, filed on Dec. 26, 2012 to the State Intellectual Property Office of the People's Republic of China, and entitled "INTERACTION METHOD AND SYSTEM FOR MOBILE TERMINALS." The two priority applications are incorporated herein by reference.

FIELD OF THE TECHNOLOGY

The present disclosure relates to the field of computer technologies, and in particular, to an interaction method and related system for interacting with a mobile terminal, and related mobile terminals.

BACKGROUND OF THE DISCLOSURE

With the development of mobile terminals such as smart phones and tablet computers and the maturing of various sensing technologies, people begin to apply these technologies to more products. However, mobile terminals still do not interact much with its users. For example, a user cannot receive data related the sensing of external environment by a mobile device.

SUMMARY

An objective of embodiments of the present invention is to provide an interaction method and system based on a mobile terminal Embodiments consistent with the present disclosure support more interactivity between mobile terminals and their users.

According to an embodiment of the present invention, an interaction method based on a mobile terminal is provided. The method includes acquiring a sensor signal (that is, a current sensor signal) from a mobile terminal; and transmitting a life emotion signal corresponding to the current sensor signal if an amplitude of the current sensor signal exceeds a set threshold. The life emotion signal includes a sound imitating a human voice.

According to another embodiment of the present invention, an interaction system based on a mobile terminal is provided. The system includes a sensing apparatus (that is, a sensing unit), configured to acquire a sensor signal that is, a current sensor signal) from a mobile terminal; and a comparison output apparatus (that is, a comparison output unit), configured to calculate an amplitude of the current sensor signal, and if the amplitude of the current sensor signal exceeds a set threshold, transmit a life emotion signal corresponding to the current sensor signal. The life emotion signal includes a sound imitating a human voice.

According to another embodiment of the present invention, a mobile terminal is provided. The mobile terminal uses the aforementioned interaction system based on a mobile terminal.

According to the embodiments of the present invention, a sensor signal from a mobile terminal may be first acquired, and if an amplitude of the current sensor signal exceeds a set threshold, a life emotion signal corresponding to the current sensor signal may be transmitted. the Embodiments of the present invention improve interactivity of the mobile terminals and provide timely feedback.

DESCRIPTION OF EMBODIMENTS

To make the objectives, technical solutions and advantages of the present disclosure more apparent and clearer, the following describes the present disclosure in further detail with reference to the accompanying drawings and embodiments. It should be understood that, specific embodiments described herein are merely used for exemplary purposes, but are not intended to limit the present disclosure.

According to the embodiments of the present invention, a sensor signal (that is, a current sensor signal) from a mobile terminal may be first acquired. If an amplitude of the current sensor signal exceeds a set threshold, a life emotion signal corresponding to the current sensor signal may be transmitted, thereby improving interactivity of the mobile terminal and providing timely feedback.

The following describes implementation of the present disclosure in detail with reference to the specific embodiments.

Embodiment 1

Figure 1:
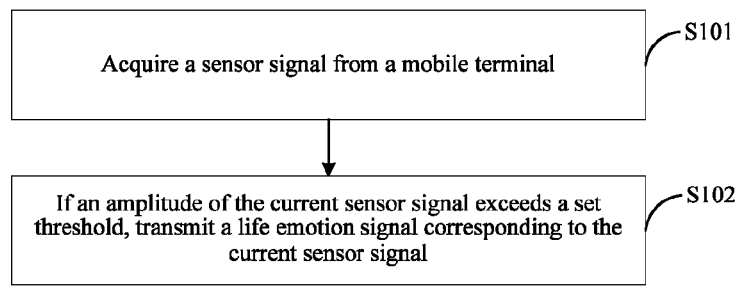
FIG. 1 is a flowchart of implementation of an interaction method based on a mobile terminal according to Embodiment 1 of the present invention.

FIG. 1 shows an implementation process of an interaction method based on a mobile terminal according to this embodiment of the present invention, which is described in detail below.

Figure 2:
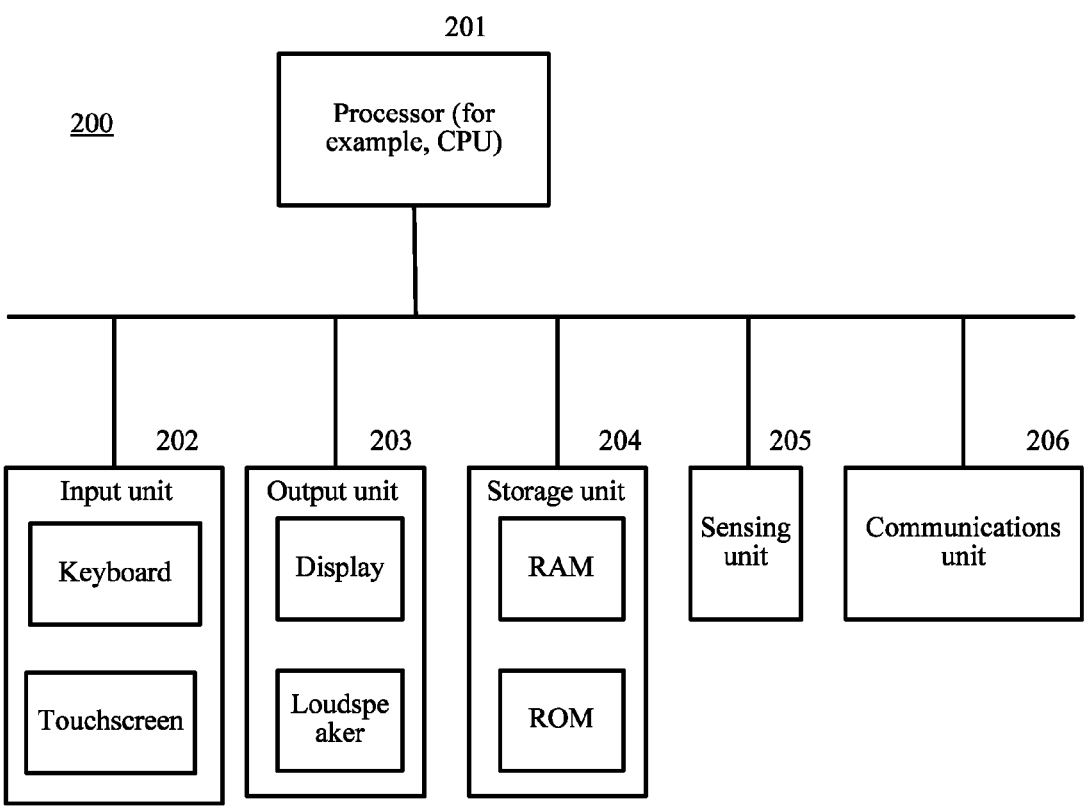
FIG. 2 is a schematic structural diagram of a mobile terminal according to an embodiment of the present invention.

First, refer to FIG. 2, which describes a structure of a mobile terminal to which the interaction method according to Embodiment 1 of the present disclosure can be applied. As shown in FIG. 2, a mobile terminal 200 may include a processor 201, an input unit 202, an output unit 203, a memory 204, a sensing unit 205, and a communications unit 206, which can be coupled with each other through a bus. The processor 201 may be a general processor including one or more processing cores, such as a central processing unit (CPU). The input unit 202 may be configured for a user to input information to the mobile terminal 200, and may include a keyboard, a mouse and/or a touchscreen. The output unit 203 may be configured to output information (for example, a life emotion signal described below) from the mobile terminal 200 to the outside world, and may include a display, a loudspeaker, and the like. The display, for example, may include a liquid crystal display (LCD), an organic light emitting diode (OLED) display, or the like. The memory 204 may be configured to store an operating system required for operating the mobile terminal, one or more application programs and various types of user data, and may include various non-volatile memories and/or volatile memories, for example, a read-only memory (ROM) and/or a random access memory (RAM). The sensing unit 205 can detect a sensor signal sent by a user on the mobile terminal as described below, and may include an acceleration sensor and/or a temperature sensor, and the like. The communications unit 206 may be configured to communicate with other devices in various (wired or wireless) manners. It should be recognized that, the structural block diagram of the mobile terminal shown in FIG. 2 is merely used for exemplary purposes. In some cases, a few devices may be added to or removed from the mobile terminal, or another structure is adopted according to specific conditions.

Referring to FIG. 1 again, in Step S101, a sensor signal (that is, a current sensor signal) from a mobile terminal is acquired in real time.

The sensor signal in this embodiment of the present invention is specifically a sound signal, a gravity signal, a pressure signal, a light signal, a temperature signal, a speed signal, or an acceleration signal. For example, when the sound signal is a sound (noise) from external environment, an amplitude of the sensor signal may be a value of a sound volume of the sound signal. When the gravity signal is a zero gravity state of the mobile terminal during a drop, an amplitude of the sensor signal may be a value of an acceleration of the mobile terminal during the drop. When the pressure signal is a pressure from a screen of the mobile terminal, an amplitude of the sensor signal may be a value of the pressure. When the light signal is light intensity of the external environment, an amplitude of the sensor signal may refer to a value of the light intensity. When the acceleration signal is an acceleration of the mobile terminal in motion, an amplitude of the sensor signal may be a value of the acceleration of the mobile terminal in motion. The mobile terminal includes a mobile phone, a tablet computer, a handheld computer, a personal digital assistant (PDA), and the like. In such a case, a corresponding sensor may be configured in the mobile terminal, so that the sensor signal can be generated by the corresponding sensor. For example, an acceleration signal can be generated by an acceleration sensor, and a temperature signal can be generated by a temperature sensor. It should be recognized that, the sensor signal may also be acquired in non-real time, and instead the sensor signal may be acquired intermittently (for example, periodically or non-periodically) or in response to an instruction from a user.

In Step S102, if an amplitude of the current sensor signal exceeds a set threshold, a life emotion signal corresponding to the current sensor signal is transmitted.

In this embodiment of the present invention, the life emotion signal may include a sound imitating a human voice, where the sound can represent different emotions or feelings of humans, such as: "it hurt when you tapped me", "it hurt when you dropped me down", "it is so hot here; let's go to somewhere cool", "it is so cool", "I am freezing to death", "it is too noisy", or "please speak gently". In this case, multiple types of life emotion signals preset in the mobile terminal are correspondingly associated with the aforementioned sensor signals. For example, "it hurt when you tapped me" is correspondingly associated with a pressure signal. "It hurt when you dropped me down" is correspondingly associated with a gravity signal. "It is so hot here; let's go to somewhere cool", "it is so cool", and "I am freezing to death" are all correspondingly associated with a temperature signal. "It is too noisy" and "please speak gently" are both correspondingly associated with a sound signal.

Figure 3:
FIG. 3 is a diagram of an exemplary application scenario of the method shown in FIG. 1 (in a non-screen-saver state)

In this embodiment of the present invention, a threshold (that is, a threshold of an amplitude) of each sensor signal may be preset. An amplitude of a current sensor signal is calculated, and if the amplitude of the current sensor signal exceeds a set threshold, a life emotion signal corresponding to the current sensor signal is transmitted. For example, a threshold of the sound signal may be preset to 80 dBs If the amplitude (for example, 90 dB or 100 dB) of the current sound signal exceeds 80 dB, a life emotion signal such as "it is too noisy" or "please speak gently" may be transmitted. In another example, a threshold of the pressure signal may be preset to 30 N. If the amplitude (for example, 40 N or 50 N) of the current pressure signal exceeds 30 N, a life emotion signal such as "it hurt when you tapped me" may be transmitted, as shown in FIG. 3. In yet another example, a threshold of the gravity signal may be preset to 9 m/s$^2$. If the amplitude (for example, 9.8 m/s$^2$) of the current gravity signal exceeds 9 m/s$^2$, a life emotion signal such as "it hurt when you dropped me down" may be transmitted. Embodiments consistent with the present disclosure thus achieve strong interactivity and provide timely feedback.

If there are multiple sensor signals acquired in real time or not in real time, the sensor signals may be first distinguished (that is, categories of the sensor signals are determined) and then respectively compared with thresholds of the sensor signals. When an amplitude of a sensor signal exceeds a set threshold, a life emotion signal corresponding to the current sensor signal may be transmitted.

In addition, when the mobile terminal transmits a signal such as "it hurt when you tapped me" or "it hurt when you dropped me down", a user would know that his mobile phone has been dropped and is alerted. This may prevent the mobile terminal from being lost. Therefore, this embodiment of the present invention can be widely used.

Embodiment 2

In this embodiment, the life emotion signal may also include an emoticon drawn when the mobile terminal is in a screen-saver state, so that the mobile terminal has (or in other words, displays on the screen) corresponding emotions, thereby further improving the interactivity between the mobile terminal and a user.

Figure 4:
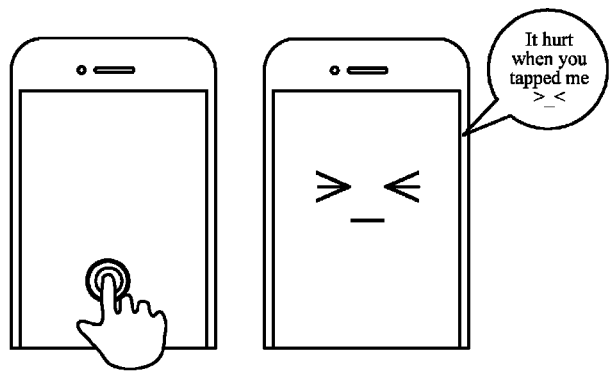
FIG. 4 is a diagram of an exemplary application scenario (a screen-saver state) of an interaction method based on a mobile terminal according to Embodiment 2 of the present invention.

Specifically, when the mobile terminal is in a screen-saver state, if an amplitude of the current sensor signal exceeds a set threshold, besides making a sound that imitates a human voice and corresponds to the current sensor signal, the mobile terminal may draw and display an emoticon corresponding to the current sensor signal. For example, if the mobile terminal is in a screen-saver state, and a current pressure signal exceeds a set threshold, an emoticon showing pain may be drawn, and a scream "it hurt when you tapped me" is output, as shown in FIG. 4. In another example, if the mobile terminal is in a screen-saver state, and a current temperature signal exceeds a set threshold, an emoticon of sweat dripping may be drawn, and a heavy panting sound is output. The drawn emoticon may overlap with or cover a screen saver.

Alternatively, the life emotion signal may also include an emoticon drawn when the mobile terminal is in a non-screen-saver state. Specifically, when the mobile terminal is in a non-screen-saver state, if an amplitude of the current sensor signal exceeds a set threshold, besides making a sound that imitates a human voice and corresponds to the current sensor signal, the mobile terminal may draw and display an emoticon corresponding to the current sensor signal. In such a case, the drawn emoticon may or may not overlap or cover content displayed on a screen of the mobile terminal.

Embodiment 3

Figure 5:
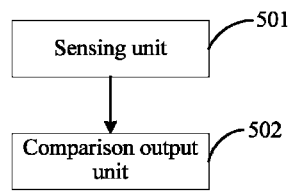
FIG. 5 is an architectural diagram of an interaction system based on a mobile terminal according to an embodiment of the present invention.

FIG. 5 shows an architecture of an interaction system based on a mobile terminal according to this embodiment of the present invention, which is described in detail below. A mobile terminal may use the interaction system. Specifically, the interaction system may be included in the mobile terminal to be a part of the mobile terminal; or may be connected to the mobile terminal in a communicable manner and exchange information with the mobile terminal.

According to this embodiment of the present invention, the interaction system based on a mobile terminal includes a sensing unit (that is, a sensing apparatus) 501 and a comparison output unit (that is, a comparison output apparatus) 502.

The sensing unit 501 is configured to acquire a sensor signal (that is, a current sensor signal) from a mobile terminal in real time. For example, the sensing unit 501 may acquire the sensor signal through various sensors configured in the mobile terminal. Alternatively, the sensing unit 501 may also acquire the sensor signal not in real time, and instead acquire the sensor signal intermittently (for example, periodically or non-periodically) or in response to an instruction from a user. The sensor signal is the same as the aforementioned sensor signal, and the details are not described here again.

The comparison output unit 502 is configured to calculate an amplitude of the current sensor signal. If the amplitude of current sensor signal exceeds a set threshold, the comparison output unit 502 may transmit a life emotion signal corresponding to the current sensor signal. The life emotion signal may include a sound imitating a human voice, and the sound can represent different emotions or feelings of humans.

The interaction system may further include a depiction unit (not shown in the figure), which is configured to draw an emoticon when the mobile terminal is in a screen-saver state. In such a case, the life emotion signal may also include an emoticon drawn when the mobile terminal is in a screen-saver state. Specifically, when the mobile terminal is in a screen-saver state, if an amplitude of the current sensor signal exceeds a set threshold, the comparison output unit 502 makes a sound that mimics a human voice and corresponds to the current sensor signal, and the depiction unit may draw and display an emoticon corresponding to the current sensor signal. The drawn emoticon may overlap a screen saver. Alternatively, the depiction unit may be configured to draw an emoticon when the mobile terminal is in a non-screen-saver state. In such a case, the life emotion signal may also include an emoticon drawn when the mobile terminal is in a non-screen-saver state. Specifically, when the mobile terminal is in a non-screen-saver state, if an amplitude of the current sensor signal exceeds a set threshold, the comparison output unit 502 makes a sound that mimics a human voice and corresponds to the current sensor signal, and the depiction unit may draw and display an emoticon corresponding to the current sensor signal. The drawn emoticon may overlap content displayed on a screen of the mobile terminal.

The interaction system may also include a storage unit (that is, a storage apparatus, not shown), configured to store multiple types of life emotion signals, where the multiple types of the life emotion signals may be correspondingly associated with the aforementioned sensor signals.

It should be noted that, specific working principles of the above units (or apparatuses) are described as above, and the details are not given here again. In addition, each unit (or apparatus) of the above interaction system based on a mobile terminal may be a software unit, a hardware unit, or a unit combining software and hardware, where the software unit may be stored in a computer-readable storage medium such as a ROM/RAM, a magnetic disk or an optical disc.

It should be recognized that, the embodiments of the present invention are described in the context of a mobile terminal, but the foregoing embodiments may also be applied in another type of terminal such as a fixed terminal.

The above descriptions merely show preferred embodiments of the present invention, but are not intended to limit the present disclosure. Any modification, equivalent replacement and improvement made within the spirit and principle of the present disclosure shall fall within the protection scope of the present disclosure.

What is claimed is:

1. A method for presenting information interactively by a mobile terminal, comprising:
    acquiring a current sensor signal by a mobile terminal, wherein the mobile terminal includes at least a processor, memory, a speaker, a display screen, and one or more sensors for collecting data from an external environment of the mobile terminal and generating sensor signals;
    comparing an amplitude of the current sensor signal with a set threshold associated with a type of the current sensor signal; and
    automatically producing, by the mobile terminal, a life emotion signal reflecting a current state of the mobile terminal corresponding to the current sensor signal if an amplitude of the current sensor signal exceeds the set threshold,
    wherein the life emotion signal is on the mobile terminal and comprises a sound imitating a human voice broadcasted by the speaker and an emoticon shown on the display screen.

2. The method according to claim 1, wherein the emoticon is drawn when the mobile terminal is in a screen-saver state.

3. The method according to claim 1, wherein the emoticon is when the mobile terminal is in a non-screen-saver state.

4. The method according to claim 1, wherein the sensor signal is a sound signal, a gravity signal, a pressure signal, a light signal, a temperature signal, a speed signal or an acceleration signal.

5. The method according to claim 4, wherein multiple types of life emotion signals are preset in the mobile terminal, and are correspondingly associated with sensor signals.

6. The method according to claim 5, wherein each type of the sensor signals is generated by a corresponding sensor configured in the mobile terminal.

7. The method according to claim 6, wherein when there are multiple acquired sensor signals, the sensor signals are first separated and then compared with a respective threshold of the type of sensor signals, and if an amplitude of a sensor signal exceeds a threshold, a life emotion signal corresponding to the sensor signal is transmitted.

8. The method according to claim 4, wherein:
    the current sensor signal is a sound signal;
    the set threshold of the sound signal is 80 dB, and when the amplitude of the current sensor signal exceeds the set threshold, the mobile terminal produces the life emotion signal informing that the mobile terminal is in a noisy environment.

9. The method according to claim 1, wherein:
the current sensor signal is a gravity signal;
the set threshold of the gravity signal is 9 m/s$^2$, and
when the amplitude of the current sensor signal exceeds the set threshold, the mobile terminal produces the life emotion signal informing a user that the mobile terminal is being dropped.

10. An system for presenting information interactively using a mobile terminal, comprising:
a sensing apparatus, configured to acquire a current sensor signal from a mobile terminal, the current sensor signal being collected from an external environment of the mobile terminal; and
a comparison output apparatus, comprising at least a processor, memory, a speaker, a display screen, configured to calculate an amplitude of the current sensor signal, and if the amplitude of the current sensor signal exceeds a set threshold, automatically produce a life emotion signal reflecting a current state of the mobile terminal corresponding to the current sensor signal, wherein the life emotion signal is presented on the mobile terminal and comprises a sound imitating a human voice broadcasted by the speaker and an emoticon shown on the display screen.

11. The system according to claim 10, further comprising:
a depiction apparatus, configured to draw the emoticon when the mobile terminal is in a screen-saver state.

12. The system according to claim 10, further comprising:
a depiction apparatus, configured to draw the emoticon when the mobile terminal is in a non-screen-saver state.

13. The system according to claim 10, wherein the sensor signal is a sound signal, a gravity signal, a pressure signal, a light signal, a temperature signal, a speed signal or an acceleration signal.

14. The system according to claim 13, further comprising:
a storage apparatus, configured to store multiple types of life emotion signals, wherein the multiple types of the life emotion signals are correspondingly associated with sensor signals.

15. The method according to claim 1, wherein:
the current sensor signal is a pressure signal; and
when the amplitude of the current sensor signal exceeds the set threshold, the mobile terminal produces the life emotion signal informing a user that the mobile terminal is under excessive amount of pressure.

16. A mobile terminal using an interaction system, the mobile terminal including at least a processor, memory, a speaker, a display screen, and one or more sensors for collecting environmental data of the mobile terminal and generating sensor signals, the interaction system comprising:
a sensing apparatus, configured to acquire a current sensor signal from a mobile terminal; and
a comparison output apparatus, configured to calculate an amplitude of the current sensor signal, and if the amplitude of the current sensor signal exceeds a set threshold, automatically produce a life emotion signal reflecting a current state of the mobile terminal corresponding to the current sensor signal, wherein the life emotion signal is presented on the mobile terminal and comprises a sound imitating a human voice broadcasted by the speaker and an emoticon shown on the display screen.

17. The mobile terminal according to claim 16, wherein the interaction system further comprises:
a depiction apparatus, configured to draw the emoticon when the mobile terminal is in a screen-saver state.

18. The mobile terminal according to claim 16, wherein the interaction system further comprises:
a depiction apparatus, configured to draw the emoticon when the mobile terminal is in a non-screen-saver state.

19. The mobile terminal according to claim 16, wherein the sensor signal is a sound signal, a gravity signal, a pressure signal, a light signal, a temperature signal, a speed signal or an acceleration signal.

20. The mobile terminal according to claim 19, wherein the interaction system further comprises:
a storage apparatus, configured to store multiple types of life emotion signals, wherein the multiple types of the life emotion signals are correspondingly associated with sensor signals.

\* \* \* \* \*